United States Patent
Pang et al.

(10) Patent No.: US 10,477,232 B2
(45) Date of Patent: Nov. 12, 2019

(54) SEARCH REGION DETERMINATION FOR INTRA BLOCK COPY IN VIDEO CODING

(71) Applicant: QUALCOMM Incorporated, San Diego, CA (US)

(72) Inventors: Chao Pang, San Diego, CA (US); Joel Sole Rojals, La Jolla, CA (US); Cheng-Teh Hsieh, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 14/663,161

(22) Filed: Mar. 19, 2015

(65) Prior Publication Data

US 2015/0271517 A1 Sep. 24, 2015

Related U.S. Application Data

(60) Provisional application No. 61/968,999, filed on Mar. 21, 2014.

(51) Int. Cl.
*H04N 19/176* (2014.01)
*H04N 19/593* (2014.01)
(Continued)

(52) U.S. Cl.
CPC ........... *H04N 19/52* (2014.11); *H04N 19/105* (2014.11); *H04N 19/139* (2014.11);
(Continued)

(58) Field of Classification Search
CPC ...... H04N 19/52; H04N 19/56; H04N 19/139; H04N 19/105; H04N 19/57; H04N 19/563; H04N 19/593; H04N 19/182
(Continued)

(56) References Cited

U.S. PATENT DOCUMENTS 7,440,500 B2* 10/2008 Pearson ................. H04N 5/145
348/E5.066
9,591,325 B2* 3/2017 Li ......................... H04N 19/593
(Continued)

FOREIGN PATENT DOCUMENTS

CN 103299620 A 9/2013
CN 103404144 A 11/2013
(Continued)

OTHER PUBLICATIONS

International Preliminary Report on Patentability from corresponding PCT Application Serial No. PCT/US2015/021789 dated Jun. 20, 2016 (10 pages).
(Continued)

*Primary Examiner* — Susan E. Hodges
(74) *Attorney, Agent, or Firm* — Shumaker & Sieffert, P.A.

(57) ABSTRACT

A video coder may determine a search region for coding a current block of video data using Intra Block Copy (Intra BC). In some examples, the video coder determines a central point for the search region, and determines the search region for the current block based on the central point and a defined size for the search region. The video coder stores reconstructed blocks of the video data from a current picture that includes the current block in a memory based on the determined search region. The video coder codes information from which to identify one of the reconstructed blocks within the search region, and codes the current block based on the identified one of the reconstructed blocks according to Intra BC.

23 Claims, 9 Drawing Sheets

(51) Int. Cl.
| | |
|---|---|
| *H04N 19/105* | (2014.01) |
| *H04N 19/52* | (2014.01) |
| *H04N 19/139* | (2014.01) |
| *H04N 19/182* | (2014.01) |
| *H04N 19/56* | (2014.01) |
| *H04N 19/563* | (2014.01) |
| *H04N 19/57* | (2014.01) |

(52) U.S. Cl.
CPC .......... *H04N 19/182* (2014.11); *H04N 19/56* (2014.11); *H04N 19/563* (2014.11); *H04N 19/57* (2014.11); *H04N 19/593* (2014.11)

(58) Field of Classification Search
USPC ....................................................... 375/240
See application file for complete search history.

(56) References Cited

U.S. PATENT DOCUMENTS

| | | | | |
|---|---|---|---|---|
| 2003/0202588 | A1* | 10/2003 | Yu ..................... | H04N 19/593 375/240.12 |
| 2011/0293012 | A1* | 12/2011 | Au ..................... | H04N 19/52 375/240.16 |
| 2012/0163456 | A1 | 6/2012 | Coban et al. | |
| 2012/0224640 | A1 | 9/2012 | Sole et al. | |
| 2012/0328013 | A1* | 12/2012 | Budagavi ............ | H04N 19/105 375/240.12 |
| 2013/0272370 | A1* | 10/2013 | Coban ............... | H04N 19/00521 375/240.01 |
| 2014/0064360 | A1* | 3/2014 | Rapaka ............... | H04N 19/105 375/240.02 |
| 2014/0301465 | A1* | 10/2014 | Kwon ................. | H04N 19/503 375/240.16 |
| 2015/0189272 | A1* | 7/2015 | Peng .................. | H04N 19/105 375/240.02 |
| 2015/0264383 | A1* | 9/2015 | Cohen ................ | H04N 19/513 375/240.16 |

FOREIGN PATENT DOCUMENTS

| | | |
|---|---|---|
| JP | H0220988 A | 1/1990 |
| WO | 2012088325 A1 | 6/2012 |
| WO | 2012121820 A1 | 9/2012 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.

Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.

Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.

Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Alshina, et al., "AhG5: Intra Block Copy within One LCU", JCT-VC Meeting; Oct. 23-Nov. 1, 2013; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-O0074-v4, Oct. 26, 2013, XP030115053, 7 pp.

Budagavi, et al., "Intra Motion Compensation and Entropy Coding Improvements for HEVC Screen Content Coding," 2013 Picture Coding Symposium (PCS), IEEE, Dec. 8, 2013, pp. 365-368, XP032567034, DOI: 10.1109/PCS.2013.6737759.

Naccari, et al., "HEVC Range Extensions Test Model 6 Encoder Description", JCT-VC Meeting; Jan. 9-17, 2014; San Jose; (Joint Collaborative Team on Video Coding of ISO/IEC JTC1/SC29/WG11 and ITU-T SG.16); URL: http://wftp3.itu.int/av-arch/jctvc-site/, No. JCTVC-P1013, Feb. 23, 2014, XP030115885, 20 pp.

Rao, et al., "Complexity Analysis of Multiple Block Sizes for Motion Compensation", ITU—Telecommunications Standardization Sector, Study Group 16 Question 6, VCEG, USA, Document VCEG-M47, Mar. 27, 2001, XP030003254, 4 pp.

Pang, et al., "Intra block copy with larger search region," JCT-VC Meeting; Mar. 27-Apr. 4, 2014; San Jose; (Joint Collaborative Team on Video Coding of ISO/IEC JTC1/SC29/WG11 and ITU-T SG.16); No. JCTVC-Q0139, Mar. 18, 2014, 6 pp.

Wang, et al., "High Efficiency Video Coding (HEVC) Defect Report 2," JCT-VC Meeting; Oct. 23-Nov. 1, 2013; San Jose; (Joint Collaborative Team on Video Coding of ISO/IEC JTC1/SC29/WG11 and ITU-T SG.16); No. JCTVC-O1003_v2; Nov. 24, 2013; 311 pp.

Flynn, et al., "High Efficiency Video Coding (HEVC) Range Extensions text specification: Draft 6," JCT-VC Meeting; Jan. 9-17, 2014; San Jose; (Joint Collaborative Team on Video Coding of ISO/IEC JTC1/SC29/WG11 and ITU-T SG.16); No. JCTVC-P1005_v1, Feb. 19, 2014; 368 pp.

International Search Report and Written Opinion from International Application No. PCT/US2015/021789, dated Jun. 12, 2015, 14 pp.

Response to Written Opinion dated Jun. 12, 2015, from International Application No. PCT/US2015/021789, filed on Jan. 21, 2016, 5 pp.

(56) References Cited

OTHER PUBLICATIONS

Second Written Opinion from International Application No. PCT/US2015/021789, dated Mar. 24, 2016, 11 pp.

Chen J., et al., "Description of Screen Content Coding Technology Proposal by Qualcomm," 17. JCT-VC Meeting, Valencia, (Joint Collaborative Team on Video Coding of ISO/IEC JTC1/SC29/WG11 and ITU-T SG.16), No. JCTVC-Q0031-v3, Mar. 28, 2014 (Mar. 28, 2014), XP030115916, pp. 1-19.

Lai P., et al., "Description of Screen Content Coding Technology Proposal by MediaTek," 17, JCT-VC Meeting; Mar. 27, 2014-Apr. 4, 2014; Valencia; (Joint Collaborative Team on Video Coding of ISO/IEC JTC1/SC29/WG11 and ITU-T SG.16); URL: http://wftp3/itu.int/av-arch/jctvc-site/, No. JCTVC-Q0033-v4, Mar. 26, 2014 (Mar. 26, 2014), pp. 1-31, XP030115920.

Li B., et al., "Description of Screen Content Coding Technology Proposal by Microsoft," 17. JCT-VC Meeting; Mar. 27, 2014-Apr. 4, 2014; Valencia; (Joint Collaborative Team on Video Coding of ISO/IEC JTC1/SC29/WG11 and ITU-T SG.16); URL: http://wftp3.itu.int/av-arch/jctvc-site/, No. JCTVC-Q0035-v2, Mar. 27, 2014 (Mar. 27, 2014), pp. 1-27, XP030115924.

Mccan K., et al., "High Efficiency Video Coding (HEVC) Test Model 13 (HM 13) Encoder Description," 15. JCT-VC Meeting; Oct. 23, 2013-Nov. 1, 2013; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-O1002, Jan. 7, 2014, XP030115456, 36 Pages.

Sole J., et al., "RCE3: Summary Report on HEVC Range Extensions Core Experiment 3 (RCE3) on Intra Block Copy Refinement," Joint Collaborative Team Video Coding (JCT-VC) of ITU-T SG 16 WP 3 and ISO/IEC JTC 1/SC 29/WG 11 16th Meeting: San Jose, US, Jan. 9-17, 2014, [JCTVC-P0034], Jan. 8, 2014, pp. 1-14.

* cited by examiner

SEARCH REGION DETERMINATION FOR INTRA BLOCK COPY IN VIDEO CODING

This application claims the benefit of U.S. Provisional Application Ser. No. 61/968,999, filed Mar. 21, 2014, the entire content of which is incorporated herein by reference.

TECHNICAL FIELD

This disclosure relates to video coding, and more particularly to techniques for predicting video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264, MPEG-4, Part 10, Advanced Video Coding (AVC), the High Efficiency Video Coding (HEVC) standard recently developed, and extensions of such standards, to transmit, receive and store digital video information more efficiently.

Video compression techniques include spatial prediction and/or temporal prediction to reduce or remove redundancy inherent in video sequences. For block-based video coding, a video picture or slice may be partitioned into blocks. Each block can be further partitioned. Blocks in an intra-coded (I) picture or slice are encoded using spatial prediction with respect to reference samples in neighboring blocks in the same picture or slice. Blocks in an inter-coded (P or B) picture or slice may use spatial prediction with respect to reference samples in neighboring blocks in the same picture or slice or temporal prediction with respect to reference samples in other reference pictures. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

This disclosure describes example techniques related to determining the search region for Intra Block Copy (Intra BC). Intra BC is a coding mode in which a current block of video data in a current picture is predicted based on a predictive block of video data within the same picture. A search region includes previously reconstructed blocks of video data from the current picture, and a block vector identifies the predictive block within the search region.

In some examples according to the techniques of this disclosure, a video coder, e.g., a video encoder and/or a video decoder, determines a central point for the search region, and determines the search region for the current block based on the central point and a defined size and/or shape for the search region. If a portion of the determined search region is unavailable, the video coder may modify the search region. Modification of the search region may include, as examples, padding, shifting, or restricting the search region. The search region determination techniques of this disclosure may provide greater flexibility in defining the search region, which in some cases may support a larger search region, and may lead to greater coding efficiency.

In one example, a method of coding video data comprises determining a central point for a search region for a current block of the video data, determining the search region for the current block based on the central point and a defined size for the search region, and storing reconstructed blocks of the video data from a current picture that includes the current block in a memory based on the determined search region. The method further comprises coding information from which to identify one of the reconstructed blocks within the search region, and coding the current block based on the identified one of the reconstructed blocks. The method may be performed by a video encoder or a video decoder.

In another example, a device comprises a video coder, and the video coder comprises a memory configured to store a video data, and one or more processors. The one or more processors are configured to determine a central point for a search region for a current block of the video data, determine the search region for the current block based on the central point and a defined size for the search region, and store reconstructed blocks of the video data from a current picture that includes the current block in the memory based on the determined search region. The one or more processors are further configured to code information from which to identify one of the reconstructed blocks within the search region, and code the current block based on the identified one of the reconstructed blocks. The video coder may be a video encoder or a video decoder.

In another example, a device for coding video data comprises means for determining a central point for a search region for a current block of the video data, means for determining the search region for the current block based on the central point and a defined size for the search region, and means for storing reconstructed blocks of the video data from a current picture that includes the current block based on the determined search region. The device further comprises means for coding information from which to identify one of the reconstructed blocks within the search region, and means for coding the current block based on the identified one of the reconstructed blocks.

In another example, a computer-readable storage medium has instructions stored thereon that when executed cause one or more processors of a video coder to determine a central point for a search region for a current block of the video data, determine the search region for the current block based on the central point and a defined size for the search region, and store reconstructed blocks of the video data from a current picture that includes the current block in a memory based on the determined search region. The instructions further cause the one or more processors to code information from which to identify one of the reconstructed blocks within the search region, and code the current block based on the identified one of the reconstructed blocks.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
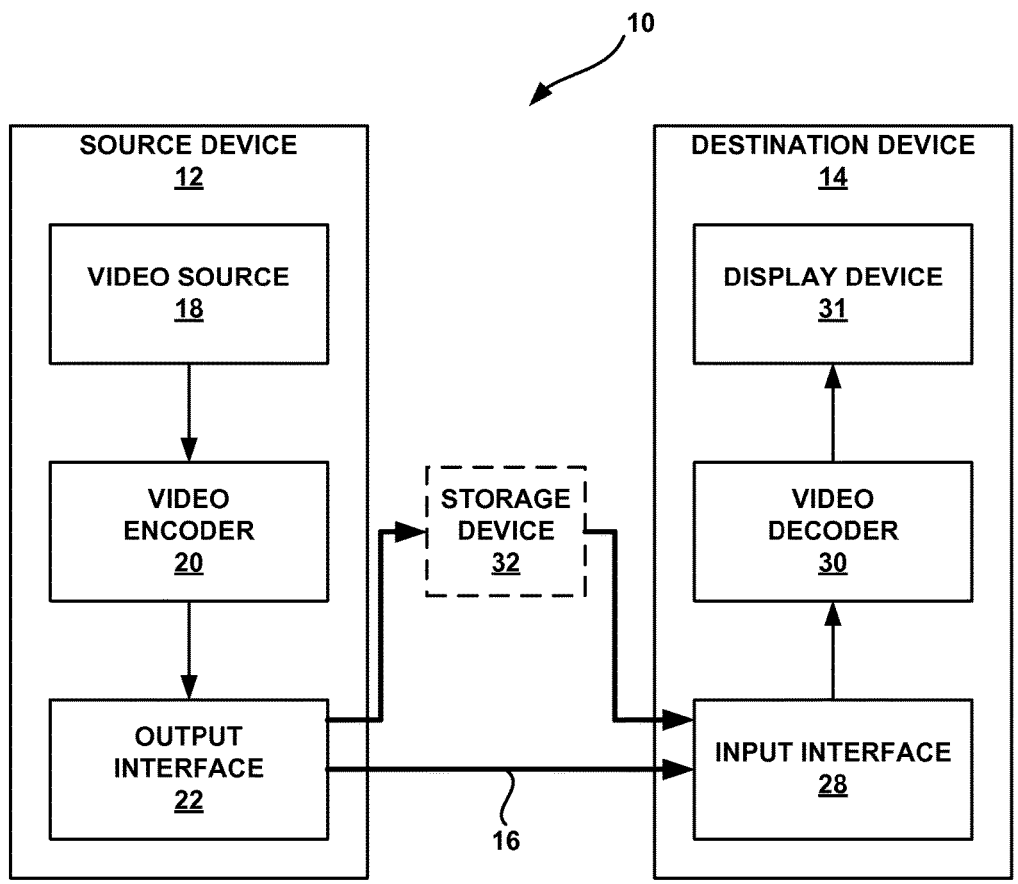
FIG. 1 is a block diagram illustrating an example video encoding and decoding system that may implement the techniques of this disclosure.

A video sequence is generally represented as a sequence of pictures. Typically, block-based coding techniques are used to code each of the individual pictures. That is, each picture is divided into blocks, and each of the blocks is individually coded. In this disclosure, the terms code, coder, and coding are respectively used to generically refer to either or both of: (1) encode, encoder, and encoding; and (2) decode, decoder, and decoding.

Coding a block of video data generally involves forming a predicted value for the block and coding a residual value, which is the difference between the original block and the predicted value. Specifically, the original block of video data includes a matrix of pixel values, and the predicted value includes a matrix of predicted pixel values. The residual value corresponds to pixel-by-pixel differences between the pixel values of the original block and the predicted pixel values.

Prediction techniques for a block of video data are generally categorized as intra-prediction or inter-prediction. Intra-prediction, or spatial prediction, generally involves predicting the block from neighboring pixel values in the same picture. Inter-prediction, or temporal prediction, generally involves predicting the block from a previously coded block of a different, previously coded picture.

Video content for many applications, such as remote desktop, remote gaming, wireless displays, automotive infotainment, cloud computing, and others, usually include combinations of natural content, text, and artificial graphics. In text and artificial graphics regions, repeated patterns, such as characters, icons, symbols, or the like, often exist. Consequently, blocks in such regions may be efficiently predicted based on pixel values that are within the same picture or frame, but not necessarily the neighboring pixel values typically used for intra-prediction.

Intra Block Copy (Intra BC) is a technique for predicting current blocks of video data from predictive blocks of video data within the same picture that do not necessarily neighbor the current blocks. Intra BC may enable a video coder to improve intra-picture coding efficiency, e.g., for text and artificial graphics regions of the picture. For Intra BC, the predictive block of video data is a reconstructed block of video data within the same picture as the current block of video data. The predictive block of video data is within a search region that is within the current picture. The location of the predictive block of video data relative to the current block is identified by a block vector, which may be a two-dimensional vector.

In some examples according to the techniques of this disclosure, a video coder, e.g., a video encoder and/or a video decoder, determines a central point for the search region, and determines the search region for the current block based on the central point and a defined size and/or shape for the search region. In some examples, a video coder determines the central point for the search region for the current block based on a block vector of a block previously coded using Intra BC. The size and/or shape of the search region may be predefined and static, or may be varied and signaled at the block, slice, picture, sequence, or other level.

If a portion of the determined search region is unavailable, the video coder may modify the search region. A portion of the search region may be unavailable if it has not been reconstructed, was inter predicted, or is across a boundary, such as a slice boundary, a tile boundary, or a picture boundary. In some examples, the video coder modifies the search region by padding the search region with copied or fixed pixel values. In some examples in which a portion of a search region having a defined size and shape is across a boundary, the video coder shifts the search region, e.g., without changing the size and shape of the search region, such that the entire search region is on one side of the boundary. In some examples in which rows of the current picture are processed in parallel using wavefront parallel processing (WPP), the video coder modifies the determined search region by restricting the search region to a region that will be reconstructed according to WPP. The search region determination techniques of this disclosure may provide greater flexibility in defining the search region, which in some cases may support a larger search region, and may lead to greater coding efficiency for Intra BC. The search region determination techniques of this disclosure may also overcome inefficiencies that may arise when a larger search region is used for Intra BC.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. Recently, the design of a new video coding standard, namely High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). The latest HEVC draft specification, and referred to as HEVC WD hereinafter, is available, as of Mar. 21, 2014, from http://phenix.int-evry.fr/jct/doc_end_user/documents/15_Geneva/wg11/JCTVC-O1003-v2.zip. The final standard may be referenced as Recommendation ITU-T H.265, October 2014.

The Range Extensions to HEVC, namely RExt, are also being developed by the JCT-VC. A recent Working Draft (WD) of the HEVC Range Extensions, referred to as "RExt WD6" or simply "RExt" hereinafter, is available, as of Mar. 21, 2014, from http://phenix.int-evry.fr/jct/doc_end_user/ documents/16_San%20Jose/wg11/JCTVC-P1005-v1.zip. In general, the Range Extensions to HEVC may support video formats that are not specifically supported by the base HEVC specification, such as high bit depth, e.g., more than 8 bit, and high chroma sampling format, e.g., 4:4:4 and 4:2:2. The Range Extensions to HEVC include a variety of video coding processes, including Intra BC. The techniques of this disclosure may be applicable to coding according to the Range Extensions to HEVC, and may also applicable for screen content coding. However, it should be understood that the techniques of this disclosure are not limited to these contexts, and may be applicable generally to video coding techniques including standards based or non-standards based video coding.

FIG. 1 is a block diagram illustrating an example video encoding and decoding system 10 that may implement the techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 of source device 12 to a storage device 32. Similarly, encoded data may be accessed from the storage device 32 by input interface 28 of destination device 14. The storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device 32 may correspond to a file server or another intermediate storage device that may store the encoded video generated by source device 12.

Destination device 14 may access stored video data from the storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 31. In accordance with this disclosure, video encoder 20 of source device 12 and video decoder 30 of destination device 14 may be configured to apply the techniques for determining a search region for encoding or decoding a video block according to Intra BC. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for determining a search region for encoding or decoding a video block according to Intra BC may be performed by any digital video encoding and/or decoding device. Although generally the techniques of this disclosure are performed by a video encoding or decoding device, the techniques may also be performed by a video codec. Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16 and/or storage device 32.

Input interface 28 of destination device 14 receives information from computer-readable medium 16 or storage device 32. The information of computer-readable medium 16 or storage device 32 may include syntax information defined by video encoder 20, which is also used by video decoder 30, that includes syntax elements that describe characteristics and/or processing of blocks and other coded units. Display device 31 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined video encoder/decoder (codec). A device including video encoder 20 and/or video decoder 30 may comprise an integrated circuit, a microprocessor, and/or a wireless communication device, such as a cellular telephone.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to storage device 32) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Video encoder 20 and video decoder 30 may operate according to a video compression standard, such as the HEVC standard. While the techniques of this disclosure are not limited to any particular coding standard, the techniques may be relevant to the HEVC standard, and particularly to the extensions of the HEVC standard, such as the RExt extension or screen content coding. The HEVC standardization efforts are based on a model of a video coding device referred to as the HEVC Test Model (HM).

In general, the working model of the HM describes that a video picture may be divided into a sequence of coding tree units (CTUs) that include both luma and chroma samples. Syntax data within a bitstream may define a largest coding unit (LCU) size, which is a largest size a CTU may have in terms of the number of pixels, e.g., 64×64. The size of a CTU can range from 16×16 to 64×64 in the HEVC main profile (although technically 8×8 CTU sizes can be supported). A video picture may be partitioned into one or more slices, each of which may include a number of consecutive CTUs. Each of the CTUs may comprise a CTB of luma samples, two corresponding CTBs of chroma samples, and syntax structures used to code the samples of the CTBs. In a monochrome picture or a picture that has three separate color planes, an CTU may comprise a single CTB and syntax structures used to code the samples of the CTB.

Each CTU may be split into coding units (CUs) according to a quadtree. In general, a quadtree data structure includes one node per CU, with a root node corresponding to the CTB. If a CU is split into four sub-CUs, the node corresponding to the CU includes four leaf nodes, each of which corresponds to one of the sub-CUs. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that has three separate color planes, a CU may comprise a single coding block and syntax structures used to code the samples of the coding block. A coding block is an N×N block of samples of a CTB. Each CU is coded with one mode, e.g., one of intra prediction, inter prediction, or Intra BC.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a CU may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a CTB may be split, referred to as a maximum CU depth, and may also define a minimum size of the coding nodes. Accordingly, a bitstream may also define a smallest coding unit (SCU). This disclosure uses the terms "block," "video block," "block of video data," or the like to refer to any of an CTU, CTB, CU, coding block, prediction unit (PU), or transform unit (TU), in the context of HEVC, or similar data structures in the context of other standards (e.g., macroblocks and sub-blocks thereof in H.264/AVC).

A CU includes a coding node and PUs and TUs associated with the coding node. A size of the CU corresponds to a size of the coding node and must be square in shape. The size of the CU may range from 8×8 pixels up to the size of the CTB with a maximum of 64×64 pixels or greater. Each CU may contain one or more PUs and one or more TUs. Each CU is coded with one mode, e.g., one of intra prediction inter prediction or Intra BC.

In general, a PU represents a spatial area corresponding to all or a portion of the corresponding CU, and may include data for retrieving predictive samples for the PU. Moreover, a PU includes data related to prediction. For example, when the CU is intra-mode encoded, data for the one or more PUs may be included in a residual quadtree (RQT), which may include data describing an intra-prediction mode for a TU corresponding to the PU. As another example, when the CU is inter-mode encoded, the one or more PUs may include data defining one or more motion vectors for the PU. As another example, when a CU is encoded according to Intra BC, the one or more PUs may include data defining one or more block vectors for the PU.

A prediction block may be a rectangular (i.e., square or non-square) block of samples on which the same prediction is applied. A PU of a CU may comprise a prediction block of luma samples, two corresponding prediction blocks of chroma samples of a picture, and syntax structures used to predict the prediction block samples. In a monochrome picture or a picture that has three separate color planes, a PU may comprise a single prediction block and syntax structures used to predict the prediction block samples. When two PUs are present in one CU, they can be half size rectangles or two rectangle size with ¼ or ¾ size of the CU.

TUs may include coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that has three separate color planes, a TU may comprise a single transform block and syntax structures used to transform the transform block samples.

Following transformation, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan.

After scanning the quantized transform coefficients to form a one-dimensional vector, video encoder 20 may entropy encode the one-dimensional vector. e.g., according to context-adaptive variable length coding (CAVLC), context-adaptive binary arithmetic coding (CABAC), syntax-based context-adaptive binary arithmetic coding (SBAC), probability interval partitioning entropy (PIPE) coding or another entropy encoding methodology. Video encoder 20 may also entropy encode syntax elements associated with the encoded video data for use by video decoder 30 in decoding the video data.

In addition, video encoder 20 may reconstruct predicted pictures, e.g., by inverse quantizing and inverse transforming residual data, and combining the residual data with prediction data. In this manner, video encoder 20 can simulate the reconstruction process performed by video decoder 30. Both video encoder 20 and video decoder 30, therefore, will have access to substantially the same reconstructed video data, e.g., pictures or blocks from pictures, for use in intra-picture, inter-picture, or Intra BC prediction.

Video encoder 20 may include in the encoded video bitstream, in addition to the encoded video data, syntax elements that inform video decoder how to decode a particular block of video data, or grouping thereof. Video encoder 20 may include the syntax elements in a variety of syntax structures, e.g., depending on the type of video structure (e.g., sequence, picture, slice, block) to which it refers, and how frequently its value may change. For example, video encoder 20 may include syntax elements in parameter sets, such as a Video Parameter Set (VPS), Sequence Parameter Set (SPS), or Picture Parameter Set (PPS). As other examples, video encoder 20 may include syntax elements in SEI messages and slice headers.

In general, video decoder 30 may perform a decoding process that is the inverse of the encoding process performed by video encoder. For example, video decoder 30 may perform entropy decoding using the inverse of the entropy encoding techniques used by video encoder to entropy encode the quantized video data. Video decoder 30 may further inverse quantize the video data using the inverse of the quantization techniques employed by video encoder 20, and may perform an inverse of the transformation used by video encoder 20 to produce the transform coefficients that quantized. Video decoder 30 may then apply the resulting residual blocks to adjacent reference video data (intra-prediction), predictive blocks from another picture (inter-prediction), or predictive blocks from the same picture (Intra BC) to produce the video block for eventual display. Video decoder 30 may be configured, instructed, controlled or directed to perform the inverse of the various processes performed by video encoder 20 based on the syntax elements provided by video encoder 20 with the encoded video data in the bitstream received by video decoder 30.

Each picture may comprise a luma component and one or more chroma components. Accordingly, the block-based encoding and decoding operations described herein may be equally applicable to blocks including or associated with luma or chroma pixel values.

Figure 2:
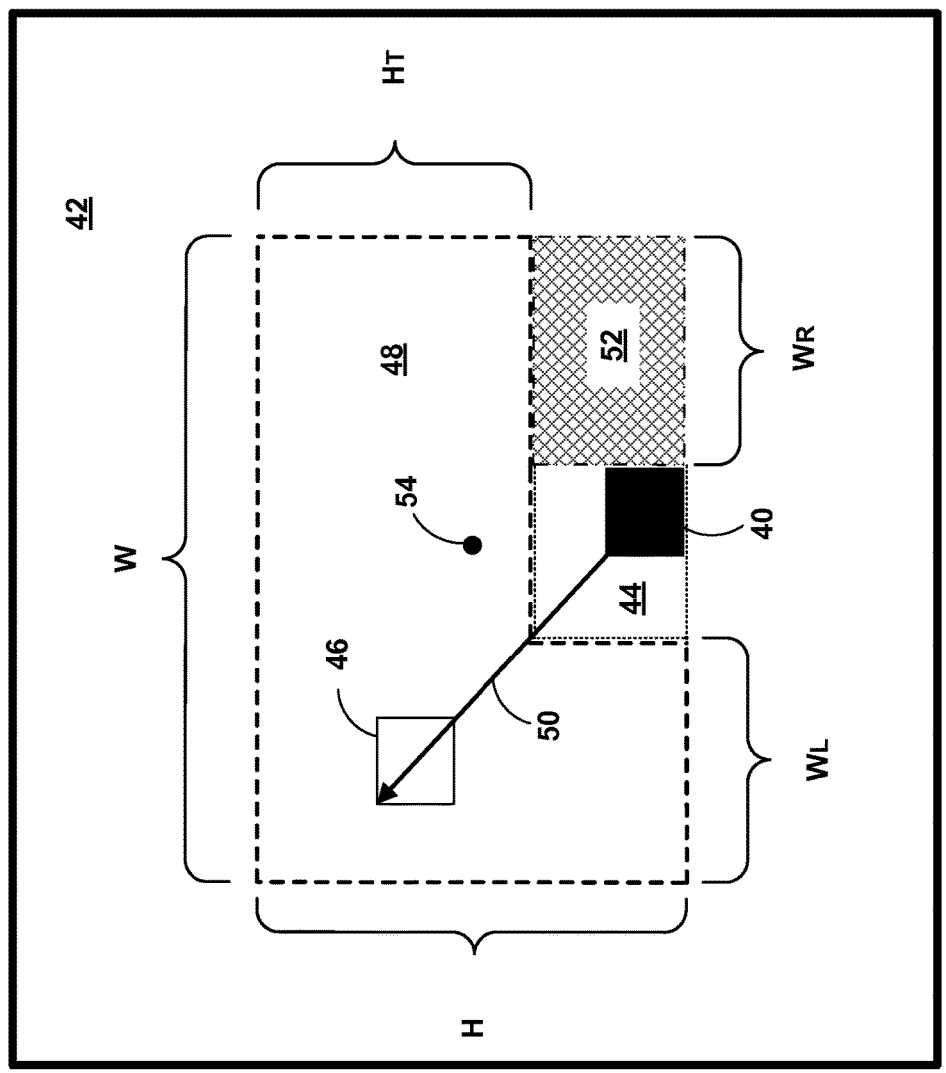
FIG. 2 is a conceptual diagram illustrating an example search region for coding a current block of video data according to an Intra Block Copy (BC) mode.

FIG. 2 is a conceptual diagram illustrating an example search region 48 for coding a current block of video data 40 according to an Intra BC mode. As illustrated by FIG. 2, search region 48 for current block 40 is within the same picture 42 as current block 40, i.e., the current picture 42. Search region 48 includes a plurality of previously reconstructed blocks of video data, including predictive block 46, within current picture 42. A video coder, e.g., video encoder 20 and/or video decoder 30, may use predictive block 46 to predict or reconstruct current block 40 according to an Intra BC mode.

Video encoder 20 selects predictive block 46 for predicting current block 40 from a set of previously reconstructed blocks of video data in current picture 42. Video encoder 20 reconstructs blocks of video data by inverse quantizing and inverse transforming the video data that is also included in the encoded video bitstream, and summing the resulting residual blocks with the predictive blocks used to predict the reconstructed blocks of video data. Video encoder 20 may define search region 48 within picture 42 in a variety of ways, as described in greater detail below. Video encoder 20 may select predictive block 46 to predict current video block 40 from among a plurality of the video blocks in search region 48 based on an analysis of the relative efficiency and accuracy of predicting and coding current video block 40 based on various video blocks within search region 48. A video coder, e.g., video encoder 20 and/or video decoder 30, may store the reconstructed blocks within search region 48 prior to in-loop filtering, such as deblocking and sample adaptive offset (SAO) filtering, in a buffer or memory, such that the prediction signal has not been subjected to in-loop filtering. Using predictive blocks that have not been in-loop filtered may increase the accuracy of the prediction and the coding efficiency for Intra BC.

Video encoder 20 determines block vector 50, which may also be referred to as an offset vector, displacement vector, or motion vector, and which represents the location or displacement of predictive video block 46 relative to current video block 40. Video encoder 20 may include one or more syntax elements that identify or define block vector 50 in the encoded video bitstream. Video decoder 30 may decode the one or more syntax elements to determine block vector 50, and use the determined vector to identify predictive video block 46 for current video block 40. Video encoder may also encode the residual difference between predictive block 46 and current block 40 in the encoded video bitstream. Video decoder 30 may decode the residual difference from the bitstream along with information to identify predictive block 46, and sum the residual with the predictive block to reconstruct current block 40.

In some examples, the resolution of block vector 50 can be integer pixel, e.g., be constrained to have integer pixel resolution. In such examples, video encoder 20 and video decoder 30 need not interpolate pixel values of predictive video block 46 to determine the predictor for current video block 40. In other examples, the resolution of one or both of a horizontal displacement component and vertical displacement component of block vector 50 can be sub-pixel, e.g., providing fractional pixel precision.

In some examples, to further increase coding efficiency, video encoder 20 and video decoder 30 may predict block vector 50. In some examples, a video coder sets the block vector predictor to (−w, 0) at the beginning of each CTB, where w is the width of the current block of video data. The video coder updates the block vector predictor to be the block vector of the latest CU coded with Intra BC mode. If a CU is not coded with Intra BC, the block vector predictor remains unchanged. After block vector prediction, the block vector difference is coded using a motion vector difference coding method, such as specified in the HEVC specification.

Current video block 40 may be a CU, or a PU of a CU, and, more particularly, a block of luma or chroma samples corresponding to a CU or PU. In some examples, a video coder, e.g., video encoder 20 and/or video decoder 30, may split a CU that is predicted according to Intra BC into a number of PUs. In such examples, the video coder may determine a respective (e.g., different) block vector 50 for each of the PUs of the CU. For example, a video coder may split a 2N×2N CU into two 2N×N PUs, two N×2N PUs, or four N×N PUs.

Video encoder 20 and video decoder 30 determine search region 48 for current block 40, e.g., the location, size, and shape of the search region, according to the techniques of this disclosure. The techniques of this disclosure may provide video encoder 20 with greater flexibility in defining search region 48, which may increase coding efficiency, while limiting increases in implementation and processing complexity, particularly at video decoder 30. In some cases, when the search region for Intra BC is enlarged, a video coder may apply restrictions or other techniques described herein to limit increases in implementation and processing complexity.

As illustrated in FIG. 2, current block 40 is within a current CTU 44. Although not shown in FIG. 2 for ease of illustration, search region 48 may include any reconstructed portion of current CTU 44. Search region 48 may additionally or alternatively include one or more neighboring reconstructed CTUs, and/or reconstructed portions of one or more neighboring CTUs.

In some examples, as illustrated in FIG. 2, a video coder determines search region 48 based on a defined size for the search region, which may be a defined size of a neighboring W×H rectangular region of current CTU 44. For example, the video coder may determine that search region 48 includes the reconstructed portion of the W×H rectangular region. As illustrated in FIG. 2, because the region of CTU height×WL width left of current CTU 44 has been reconstructed, the video coder includes that region in search region 48. On the other hand, because region 52 of CTU height×WR width to the right of current CTU 44 has not been reconstructed, the video coder does not include region 52 in search region 48. A video coder may also include any portions within the W×HT region above current CTU 44 in search region 48.

In some examples, the size and/or shape for search region 48, e.g., the size and/or shape of the region, the reconstructed portion of which is search region 48, such as the W×H rectangular region illustrated in FIG. 2, is predefined, fixed, and known to both video encoder 20 and video decoder 30. In other examples, video encoder 20 may vary the size and/or shape of the region, and signal information to video decoder 30 to enable video decoder 30 to determine the size and/or shape of the search region. In such examples, video encoder 20 may vary the size and/or shape of the region on a per-block, per-slice, per-picture, or per-sequence basis, and signal the size and/or shape in corresponding syntax structures, such as a slice header, PPS, VPS. SEI message, or video usability information (VUI) syntax structure. In some examples, the size and/or shape of search region 48 varies based on a location of current CTU 44 within picture 42 in a manner known to both video encoder 20 and video decoder 30, and the video coders determine the size and/or shape of search region 48 based on the CTU location.

In any case, the size may be defined in terms of the CTU or LCU size, or in terms of pixel units. For example, the size of W×H rectangular region may be defined as a multiple of a CTU or LCU width, such 5*LCUWidth, and a height of the rectangular region may be defined as a multiple of a CTB or LCU height, such as 4*LCUHeight. As another example, the size of W×H rectangular region may be defined as 320×256 pixel units. In some examples, the size, such as the multiples of CTU or LCU height and/or width, may be signaled by video encoder 20 for video decoder 30.

As illustrated in FIG. 2, the W×H rectangular region includes a central point 54. In some examples, a video coder, e.g., video encoder 20 and/or video decoder 30, determines central point 54, and determines search region 48 for current block 40 based on central point 54 and a defined size and/or shape for search region 48. Although illustrated in FIG. 2 as being centered horizontally relative to current CTU 44 and extending to the bottom of the row of CTUs that includes current CTU 44, in such examples the search region may be displaced horizontally in either direction and/or vertically above the bottom of the row of CTUs that includes current CTU 44, depending on the determined location of central point 54. Varying the location of central point 54 relative to the current CTU 44 or current block 40 may allow identification of a more accurate predictive block 46, which may increase coding efficiency.

In some examples, a video coder determines central point 54 based on a previous block vector of a previously coded video block. For example, a video coder may identify a first block vector of current CTU 44, and determine central point 54 based on the location to which the first block vector points. The first block vector of current CTU 44 may be the block vector of the first CU of current CTU 44 that was coded using the Intra BC mode.

As another example, a video coder may identify a block vector of a neighboring block, and determine central point 54 based on the location to which the block vector of the neighboring block points. The neighboring block may be a spatial or temporal neighboring block of current block 40, or of current CTU 44. In some examples, which neighboring block is used for determining central point 54 for search region 48 of current block 40 is fixed and known to both video encoder 20 and video decoder 30. In other examples, video encoder 20 and video decoder 30 may construct a list of candidate neighboring blocks using a defined process, and video encoder 20 may signal the candidate neighboring block whose block vector is used to determine central point 54 to video decoder in the encoded video bitstream.

In some examples, video encoder 20 signals the location within current picture 42 of central point 54 to video decoder 30 within the encoded video bitstream. In such examples, video encoder 20 may vary the location of central point 54 on a per-block or per-slice basis, and signal the location in a syntax structure, such as a slice header. Video coders store reconstructed video blocks. e.g., that have not been in-loop filtered, within a buffer or other memory based on the determined search region 48. In examples in which central location 54, and/or the size or shape for search region 48 are varied on a per-block or per-slice basis, the video coders may need to store reconstructed video blocks that were not part of a search region for one block so that they remain available for a search region of a subsequently coded block.

In some cases, it is possible that part of a search region, e.g., determined according to the techniques described with respect to FIG. 2, is not available for Intra BC prediction. For example, part of a search region that is across a boundary of a slice, tile, or picture that includes the current block may be unavailable. As another example, when WPP is used to code rows of CTUs in a picture in parallel, CTUs in the upper CTU rows that have not been processed according to the CTU delay for WPP may be unavailable. As another example, any portion of the search region that has not been reconstructed, or, when constrained intra prediction is enabled, any portion of the search region that is inter predicted, is unavailable.

In some examples, when a video coder determines that part of the search region is unavailable for Intra BC coding of the current video block, the video coder may apply any of one or more of the techniques described herein to modify the determined search region. In some examples, a video coder modifies the determined search region by restricting it to the available region. In some examples, the video coder modifies the determined search region by padding the unavailable portion of the search region.

The video coder may pad the unavailable portion by, for example, using padding techniques described in the HEVC specification for inter reference frames. In some examples, the video coder may pad the unavailable portion by horizontal and/or vertical copying of samples, such as copying of proximate, e.g., the nearest, available samples. In some examples, the video coder may pad the unavailable portion by filling the unavailable portion with fixed sample values, such as according to 0, 1<<(B−1), e.g., samples from this set, where B is the sample bitdepth. In some examples, a video coder may use copying and filling together to pad a search region for a current block, e.g., the video coder may use filling with fixed values when proximate samples are not available for copying.

Figure 3A:
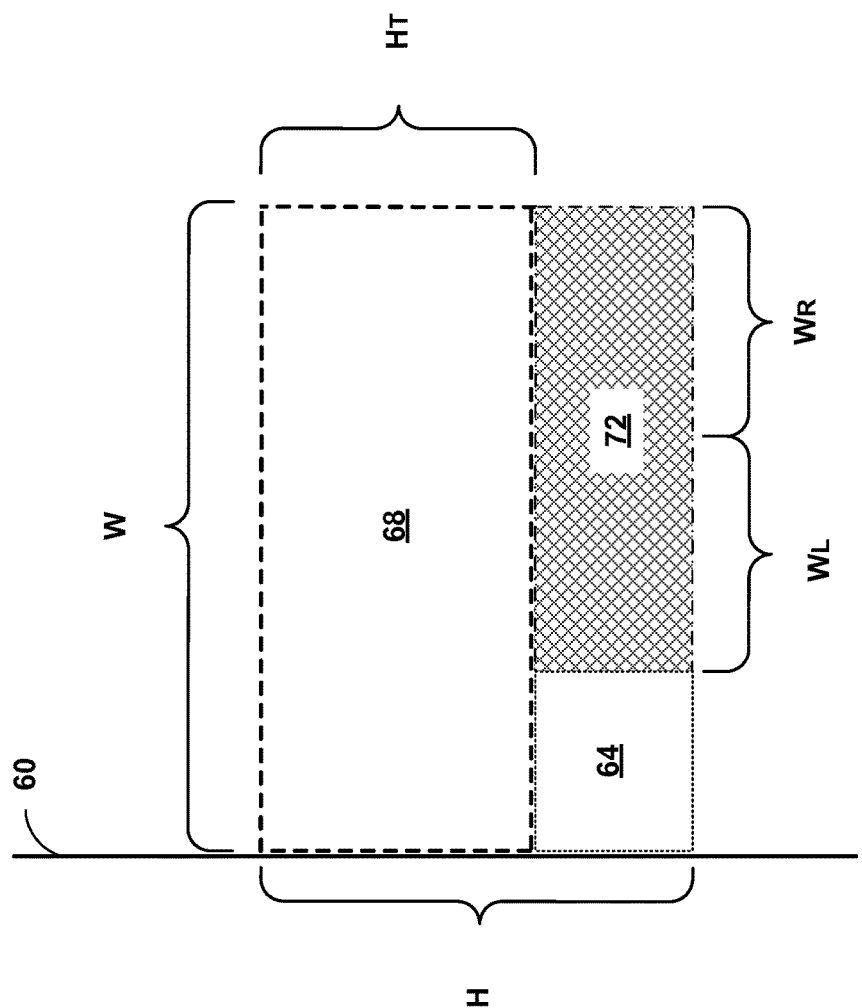
FIGS. 3A and 3B are conceptual diagrams illustrating shifting of search regions for an Intra BC mode when a portion of the search region is across a boundary.
Figure 3B:
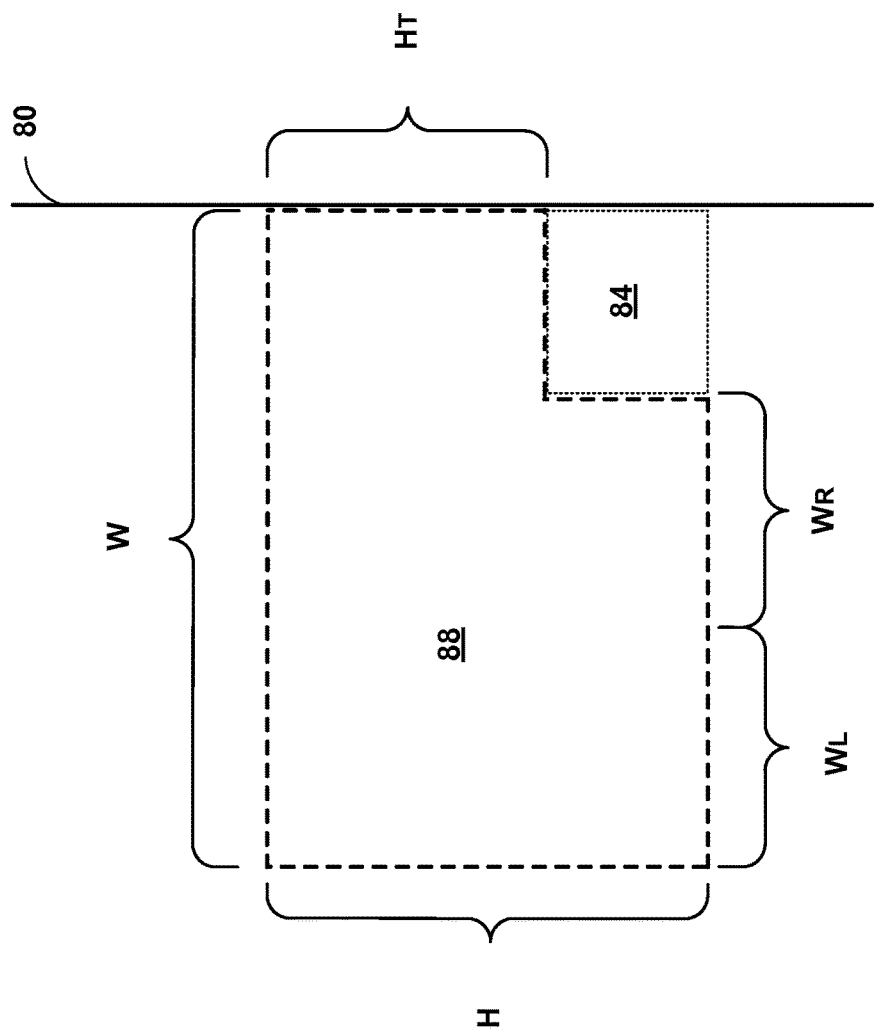

FIGS. 3A and 3B are conceptual diagrams illustrating shifting of search regions for Intra BC when a portion of the search region is across a boundary. In some examples, a portion of a search region may be unavailable because it is on a different side of a boundary, such as a slice boundary, tile boundary, or picture boundary, then the current video block. Portions of a search region that are across slice and tile boundaries may be considered unavailable due to separate and/or parallel processing of different slices or tiles, or because the video data for different slices or tiles may be transmitted in different network abstraction layer units, increasing the likelihood that the data for another slice or tile may be lost, as examples.

In some examples, when a video coder determines that a portion of the search region, e.g., determined according to the techniques described with respect to FIG. 2, is on a different side of a boundary than the current block, the video coder may shift the search region such that an entirety of the search region is on a same side of the boundary as the current block. In some examples, the video coder may shift the search region without altering the size and/or shape of search region, e.g., without altering the size and shape of the W×H rectangular region. In general, shifting the search region does not refer to shifting pixel values within a picture, but instead may include storing different blocks in, or retrieving different stored blocks from a buffer of reconstructed blocks of the current picture, according to the new location of the search region after shifting.

The example of FIG. 3A illustrates a search region 68 for a current video block within a current CTU 64. Like search region 48 of FIG. 2, a video coder may determine search region 68 based on a W×H rectangle that is centered relative to current CTU 64 in the manner illustrated with respect to current CTU 44 of FIG. 2. However, centering search region 68 in the manner illustrated with respect to current CTU 44 of FIG. 2 would place a portion of search region 68 over boundary 60, which may be a slice boundary, tile boundary, or picture boundary.

In such examples, as illustrated FIG. 3A, a video coder, e.g., video encoder 20 and/or video decoder 30, may shift search region 68 to the right such that the entirety of search region 68 is located on the right side of boundary 60. As illustrated in FIG. 3A, because region 72 of CTU height× (WR+WL) width to the right of current CTU 64 has not been reconstructed, the video coder does not include region 72 in search region 68. A video coder may also include any portions with the W×HT region above current CTU 64 in search region 68.

The example of FIG. 3B illustrates a search region 88 for a current video block within a current CTU 84. Like search region 48 of FIG. 2, a video coder may determine search region 88 based on a W×H rectangle that is centered relative to current CTU 84 in the manner illustrated with respect to current CTU 44 of FIG. 2. However, centering search region 88 in the manner illustrated with respect to current CTU 44 of FIG. 2 would place a portion of search region 88 over boundary 80, which may be a slice boundary, tile boundary, or picture boundary. In such examples, as illustrated FIG. 3B, a video coder, e.g., video encoder 20 and/or video decoder 30, may shift search region 88 to the left such that the entirety of search region 88 is located on the left side of boundary 80.

As described above, when WPP is used to code rows of CTUs in a picture in parallel, CTUs in the upper CTU rows that have not been processed according to the CTU delay for WPP may be unavailable. In general, when WPP is enabled, a video coder divides a slice into rows of CTUs, and processes the rows in parallel with a lag from row-to-row in the vertical direction. For example, the video coder may process the first or top row, and begin to process the second row only after a delay, e.g., after two CTUs have been processed in the first row. The video coder may process the third row only after a delay, e.g., after two CTUs have been processed in the second row, and so on. The context models of the entropy coder in each row are inferred from those in the preceding row with a two-CTU processing lag. WPP provides a form of processing parallelism at a rather fine level of granularity, e.g., within a slice. WPP may often provide better compression performance than tiles, and avoid some visual artifacts that may be induced by using tiles.

Figure 4:
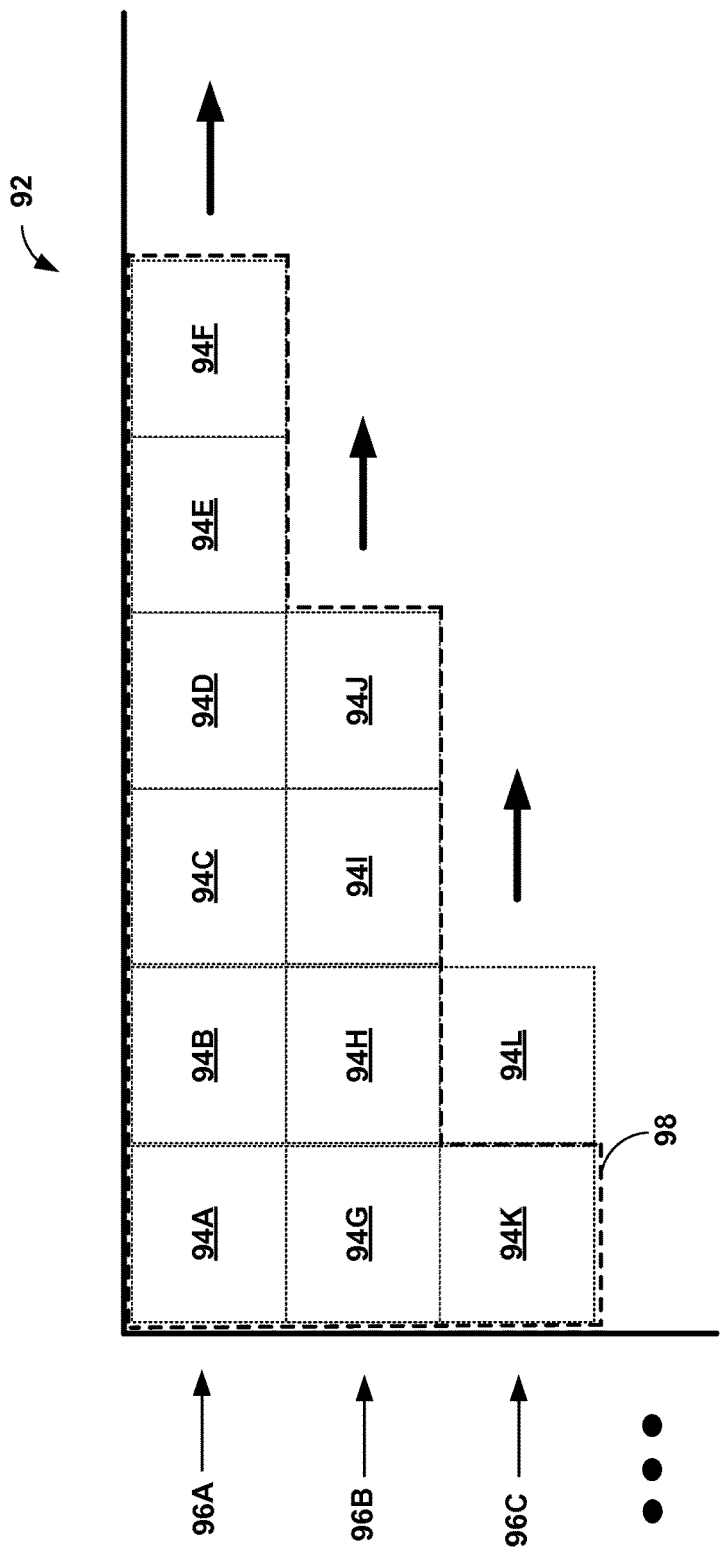
FIG. 4 is a conceptual diagram illustrating restriction of a search region when wavefront parallel processing (WPP) is used to code a current picture.

FIG. 4 is a conceptual diagram illustrating restriction of a search region 98 for a current video block within a current CTU 94L when wavefront parallel processing (WPP) is used to code a current picture 92. FIG. 4 illustrates CTUs 94A-94L (collectively. "CTUs 94") arranged in rows 96A-96C (collectively. "rows 96"). The number of CTUs 94 illustrated in each of rows 96 also illustrates the two CTU lag from row-to-row vertically from row 96A through row 96C for WPP of picture 92. When WPP is used, there may be an area of a search region, e.g., determined based on a rectangular region according to the techniques of FIG. 2, that might or might not be available to predict from, due to the lag, or due to different speed of processing of the different rows.

In some examples, a video coder, e.g., video encoder 20 and/or video decoder 30, may determine that WPP is used to code current picture 92, and restrict search region 98 for a current block in a current CTU 94L based on the determination that WPP is used to code the current picture. For example, the video coder may restrict search region 98 to CTUs that are left of and in a current row 96C of current CTU 94L that includes the current block, i.e., CTU 94K. As another example, the video coder may restrict search region 98 to CTUs that are left, diagonally left-above, or above relative to the current CTU 94L, e.g., CTUs 94A, 94B, 94G. 94H, and 94K. As another example, as illustrated in FIG. 4, the video coder may restrict search region 98 to CTUs that are left, diagonally left-above, or above relative to the current CTU and, for rows above the current row, an additional two rightward CTUs per row above the current row according to the coding delay for WPP, i.e., CTUs 94A-94K.

In some examples according to the techniques of this disclosure, the search region for Intra BC coding of any block in a current picture is the entire reconstructed portion of the picture, which may be substantially the entire reconstructed picture. If the search region is enlarged in this manner, then additional memory may be required to provide a buffer adequate to store the reconstructed blocks of the picture. Additional memory to store an entire reconstructed picture for Intra BC could be burdensome for video coders, such as video encoder 20 and, particularly, video decoder 30.

Picture or frame buffers are already used for inter prediction. To avoid the additional frame buffer for Intra BC, a video coder may repurpose one buffer that is used to store one reference frame for inter frames to instead store the reconstructed picture used for Intra BC prediction. The video coder may handle the conflicting use of this frame buffer in any of a variety of ways.

For example, the video coder may disable Intra BC for frames in which inter prediction is also performed. However, disabling Intra BC for inter frames can have some losses in terms of performance. In another example, to reduce such losses, a video coder may use the full frame as the search region for Intra BC for frames in which inter prediction is not performed and, for frames in which inter prediction is performed, use a smaller search region, e.g., determined according to the techniques described above with reference to FIGS. 2-4. In other examples, the number of reference frames is reduced by 1 for all frames, including those for which inter prediction is performed, and a video coder may only use the remaining reference frames for inter prediction.

Figure 5:
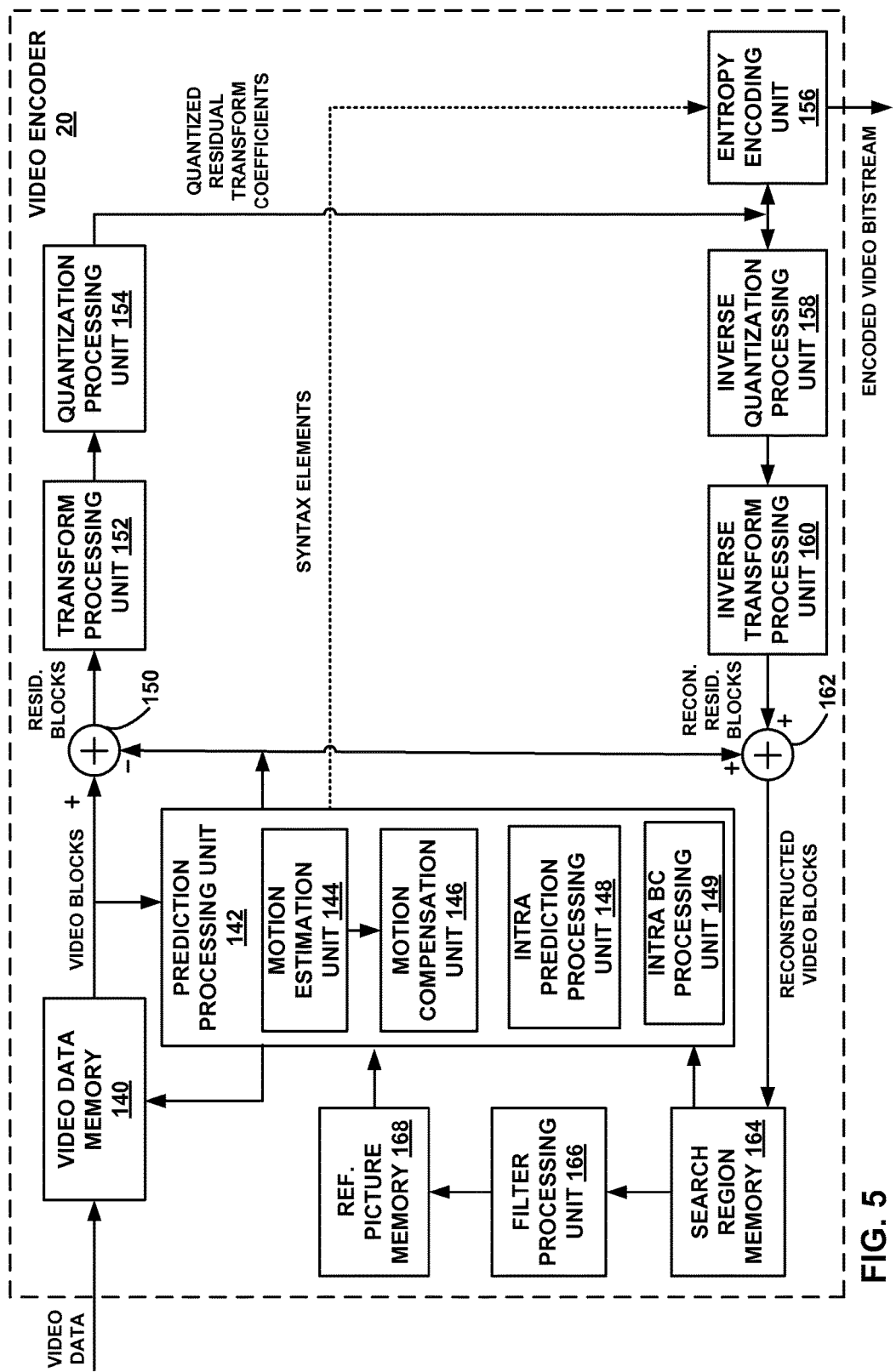
FIG. 5 is a block diagram illustrating an example video encoder that may implement the techniques of this disclosure.

FIG. 5 is a block diagram illustrating an example of a video encoder 20 that may use techniques for determining a search region for Intra BC described in this disclosure. The video encoder 20 will be described in the context of HEVC coding for purposes of illustration, but without limitation of this disclosure as to other coding standards. Moreover, video encoder 20 may be configured to implement techniques in accordance with the range extensions (RExt) or screen content coding (SCC) extensions to HEVC.

Video encoder 20 may perform intra- and inter-coding of video blocks within video slices. Intra-coding relies on spatial prediction to reduce or remove spatial redundancy in video within a given video picture. Inter-coding relies on temporal prediction or inter-view prediction to reduce or remove temporal redundancy in video within adjacent pictures of a video sequence or reduce or remove redundancy with video in other views. Intra-mode (I mode) may refer to any of several spatial based compression modes. Inter-modes, such as uni-directional prediction (P mode) or bi-prediction (B mode), may refer to any of several temporal-based compression modes.

Video encoder 20 may also be configured to an Intra BC mode to predict blocks of video data based on other reconstructed blocks of video data from the same picture, as described herein.

In the example of FIG. 5, video encoder 20 may include video data memory 140, prediction processing unit 142, search region memory 164, filter processing unit 166, reference picture memory 168, summer 150, transform processing unit 152, quantization processing unit 154, and entropy encoding unit 156. Prediction processing unit 142, in turn, includes motion estimation unit 144, motion compensation unit 146, intra-prediction processing unit 148, and Intra BC processing unit 149. For video block reconstruction, video encoder 20 also includes inverse quantization processing unit 158, inverse transform processing unit 160, and summer 162.

In various examples, a unit of video encoder 20 may be tasked to perform the techniques of this disclosure. Also, in some examples, the techniques of this disclosure may be divided among one or more of the units of video encoder 20. For example, Intra BC processing unit 149 may perform the techniques of this disclosure, alone, or in combination with other units of video encoder 20, such as motion estimation unit 144, motion compensation unit 146, intra prediction processing unit 148, search region memory 164, and entropy encoding unit 156.

Video data memory 140 may store video data to be encoded by the components of video encoder 20. The video data stored in video data memory 140 may be obtained, for example, from video source 18. Search region memory 164 and reference picture memory 168 are examples of buffers that store reference video data for use in encoding video data by video encoder 20 (e.g., in intra- or inter-coding modes, also referred to as intra- or inter-prediction coding modes, as well as Intra BC mode). Video data memory 140, search region memory 164, and reference picture memory 168 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 140, search region memory 164, and reference picture memory 168 may be provided by the same memory device or separate memory devices. In various examples, video data memory 140 may be on-chip with other components of video encoder 20, or off-chip relative to those components.

During the encoding process, video encoder 20 receives a video picture or slice to be coded. The picture or slice may be divided into multiple video blocks. Although not illustrated in FIG. 5, video encoder 20 may include a partitioning unit that partitions the data into video blocks. This partitioning may also include partitioning into slices, tiles, or other larger units, as well as video block partitioning, e.g., according to a quadtree structure of CTUs and CUs.

Motion estimation unit 144 and motion compensation unit 146 perform inter-predictive coding of the received video block relative to one or more blocks in one or more reference pictures to provide temporal compression or provide inter-view compression. Intra-prediction processing unit 148 may alternatively perform intra-predictive coding of the received video block relative to one or more neighboring blocks in the same picture or slice as the block to be coded to provide spatial compression. Video encoder 20 may perform multiple coding passes (e.g., to select an appropriate coding mode for each block of video data).

Prediction processing unit 142 may select one of the coding modes, e.g., intra, inter, or Intra BC, based on error results, and provides the resulting coded block to summer 150 to generate residual block data and to summer 162 to reconstruct the encoded block for use within a search region and/or as a reference picture. Prediction processing unit 142 also provides syntax information, such as motion vectors, intra-mode indicators, partition information, block vectors, and any other syntax information, to entropy encoding unit 156.

Motion estimation unit 144 and motion compensation unit 146 may be highly integrated, but are illustrated separately for conceptual purposes. Motion estimation, performed by motion estimation unit 144, is the process of generating motion vectors, which estimate motion for video blocks. A motion vector, for example, may indicate the displacement of a PU of a video block within a current video picture relative to a predictive block within a reference picture (or other coded unit) relative to the current block being coded within the current picture (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 168. For example, video encoder 20 may interpolate values of one-quarter pixel positions, one-eighth pixel positions, or other fractional pixel positions of the reference picture. Therefore, motion estimation unit 144 may perform a motion search relative to the full pixel positions and fractional pixel positions and output a motion vector with fractional pixel precision.

Motion estimation unit 144 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 168. Motion estimation unit 144 sends the calculated motion vector to entropy encoding unit 156 and motion compensation unit 146.

Motion compensation, performed by motion compensation unit 146, may involve fetching or generating the predictive block based on the motion vector determined by motion estimation unit 144. Again, motion estimation unit 144 and motion compensation unit 146 may be functionally integrated, in some examples. Upon receiving the motion vector for the PU of the current video block, motion compensation unit 146 may locate the predictive block to which the motion vector points in one of the reference picture lists. Summer 150 forms a residual video block by subtracting pixel values of the predictive block from the pixel values of the current video block being coded, forming pixel difference values, as discussed below. In general, motion estimation unit 144 performs motion estimation relative to luma components, and motion compensation unit 146 uses motion vectors calculated based on the luma components for both chroma components and luma components. Prediction processing unit 142 may also generate syntax elements associated with the video blocks and the video slice for use by video decoder 30 in decoding the video blocks of the video slice.

Intra-prediction processing unit 148 may intra-predict a current block, as an alternative to the inter-prediction performed by motion estimation unit 144 and motion compensation unit 146, as described above. In particular, intra-prediction processing unit 148 may determine an intra-prediction mode to use to encode a current block. In some examples, intra-prediction processing unit 148 may encode a current block using various intra-prediction modes, e.g., during separate encoding passes, and intra-prediction unit 148 may select an appropriate intra-prediction mode to use from the tested modes.

For example, intra-prediction processing unit 148 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction processing unit 148 may calculate ratios from the distortions and rates for the various encoded blocks to determine which intra-prediction mode exhibits the best rate-distortion value for the block.

In some examples, Intra BC processing unit 149 may generate block vectors and fetch predictive blocks in a manner similar to that described above with respect to motion vectors, motion estimation unit 144, and motion compensation unit 146, but with the predictive blocks being in the same picture or frame as the current block and, more particularly, within a search region within the current picture. Similar to inter- and intra-prediction, for Intra BC, a predictive block may be a block that is found to closely match the block to be coded, in terms of pixel difference, which may be determined by SAD, SSD, or other difference metrics, and identification of the block may include calculation of values for sub-integer pixel positions. In some examples, prediction processing unit 142 of video encoder 20 may select which if inter- intra- or Intra BC prediction is used to predict a given bloc based on the results of each mode, e.g., as reflected by SAD, SSD, or other difference or coding efficiency metrics. After prediction processing unit 142 generates the predictive block for the current video block via inter-prediction, intra-prediction, or Intra BC prediction, video encoder 20 forms a residual video block by subtracting the predictive block from the current video block, e.g., via summer 150.

The residual video data in the residual block may be included in one or more TUs and applied to transform processing unit 152. Transform processing unit 152 applies a transform, such as a discrete cosine transform (DCT) or a conceptually similar transform, to the residual block, producing a video block comprising residual transform coefficient values. Transform processing unit 152 may perform other transforms which are conceptually similar to DCT. Wavelet transforms, integer transforms, sub-band transforms or other types of transforms could also be used. In any case, transform processing unit 152 applies the transform to the residual block, producing a block of residual transform coefficients. The transform may convert the residual information from a pixel value domain to a transform domain, such as a frequency domain.

Transform processing unit 152 may send the resulting transform coefficients to quantization processing unit 154. Quantization processing unit 154 quantizes the transform coefficients to further reduce bit rate. The quantization process may reduce the bit depth associated with some or all of the coefficients. The degree of quantization may be modified by adjusting a quantization parameter. In some examples, quantization processing unit 154 may then perform a scan of the matrix including the quantized transform coefficients. Alternatively, entropy encoding unit 156 may perform the scan.

Following quantization, entropy encoding unit 156 entropy encodes the quantized transform coefficients. For example, entropy encoding unit 156 may perform CAVLC, CABAC, SBAC, PIPE coding or another entropy coding technique. In the case of context-based entropy coding, context may be based on neighboring blocks. Following the entropy coding by entropy encoding unit 156, the encoded bitstream may be transmitted to another device (e.g., video decoder 30) or archived for later transmission or retrieval.

Inverse quantization processing unit 158 and inverse transform processing unit 160 apply inverse quantization and inverse transformation, respectively, to reconstruct the residual block in the pixel domain. Summer 162 adds the reconstructed residual block to the predictive block to produce a reconstructed video block for storage in one or both of search region memory 164 and reference picture memory 168. The reconstructed video block may be used by motion estimation unit 144 and motion compensation unit 146 as a predictive block to inter-code a block in a subsequent video picture, or by Intra BC processing unit 149 as a predictive block for Intra BC coding of a subsequent block in the current picture.

Search region memory 164 stores reconstructed video blocks according to the definition or determination of the search region for Intra BC of a current video block by video encoder 20, e.g., Intra BC processing unit 149, using any of the techniques described herein. Search region memory 164 may store reconstructed video blocks that have not been in-loop filtered by filter processing unit 166. Summer 162 may provide the reconstructed video blocks to filter processing unit 166 in parallel with search region memory 164. Intra BC processing unit 149 may search the reconstructed video blocks in search region memory 164 for a predictive video block within the same picture as the current video block to predict the current video block according to the Intra BC prediction mode. In some examples, as discussed above, memory sufficient to buffer the reconstructed video data of substantially an entire picture or frame may be allocated from reference picture memory 168 to search region memory 164.

Figure 7:
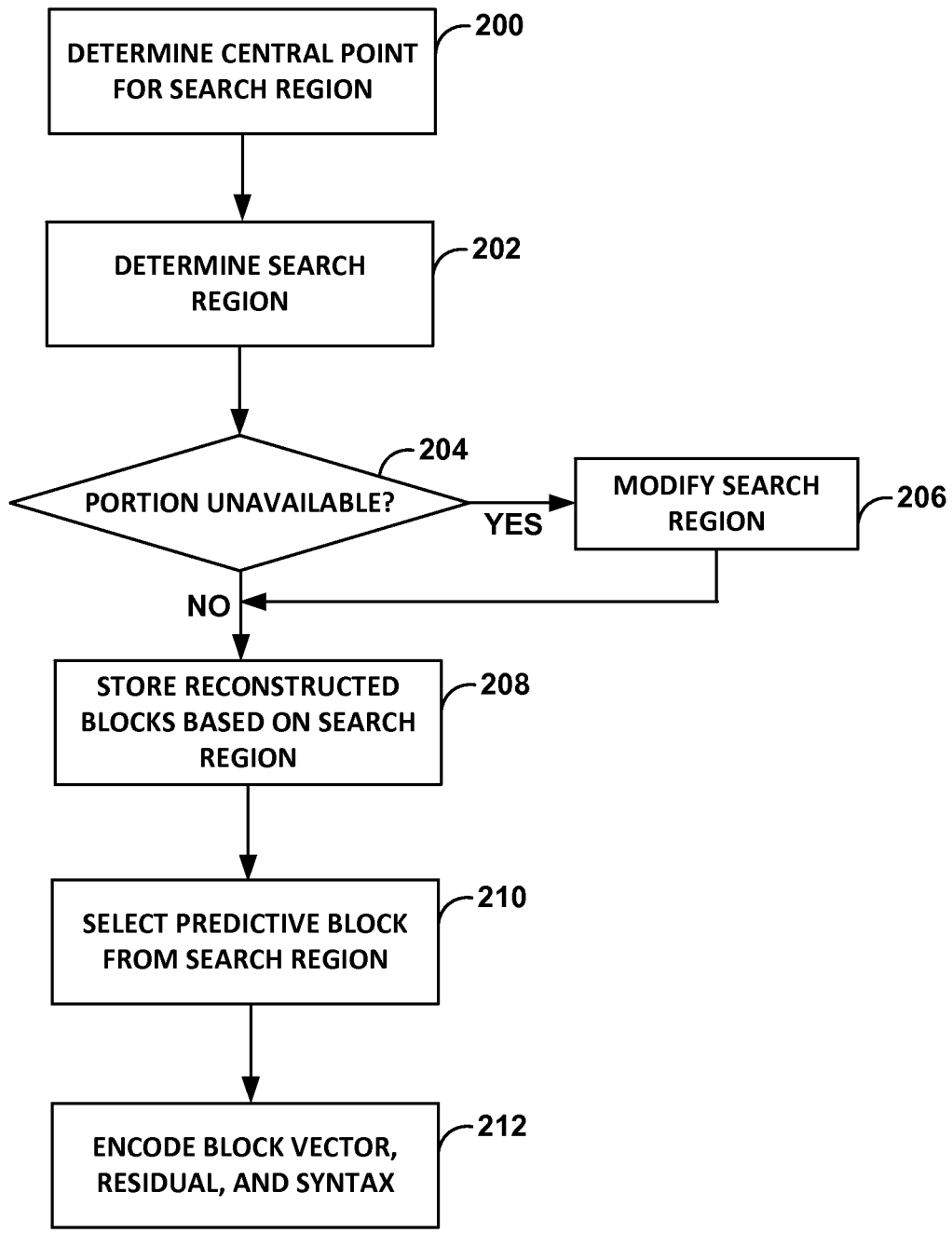
FIG. 7 is a flow diagram illustrating an example method for determining a search region for encoding a current block of video data according to an Intra BC mode according to the techniques of this disclosure.

Filter processing unit 166 may perform in-loop filtering on the reconstructed video blocks. In-loop filtering may include deblock filtering to filter block boundaries to remove blockiness artifacts from reconstructed video. In-loop filtering may also include SAO filtering to improve the reconstructed video. Reconstructed blocks, some of which may be in-loop filtered, may be stored in reference picture memory 168 as reference pictures. The reference pictures may include reconstructed blocks that may be used by motion estimation unit 144 and motion compensation unit 144 as a predictive block to inter-predict a block in a subsequent video frame or picture. Although filter processing unit 166 is illustrated in FIG. 7 as receiving information from search region memory 164, filter processing unit 166 does not necessarily receive reconstructed video blocks from the search region memory, and may received different blocks or other date than the search region memory, e.g., blocks that were never included in search region memory 164.

In this way, video encoder 20 may be configured to implement one or more example techniques described in this disclosure. For example, video encoder 20, e.g., Intra BC processing unit 149, may be configured to determine a central point for a search region for Intra Block Copy coding a current block of video data, determine the search region for the current block based on the central point and a defined size for the search region, and store reconstructed blocks of the video data from a current picture that includes the current block in the memory. e.g., within search region memory 164, based on the determined search region. Video encoder 20 may be configured to encode information from which to identify one of the reconstructed blocks within the search region in an encoded video bitstream that includes the video data, and encode the current block based on the identified one of the reconstructed blocks according to Intra Block Copy.

Figure 6:
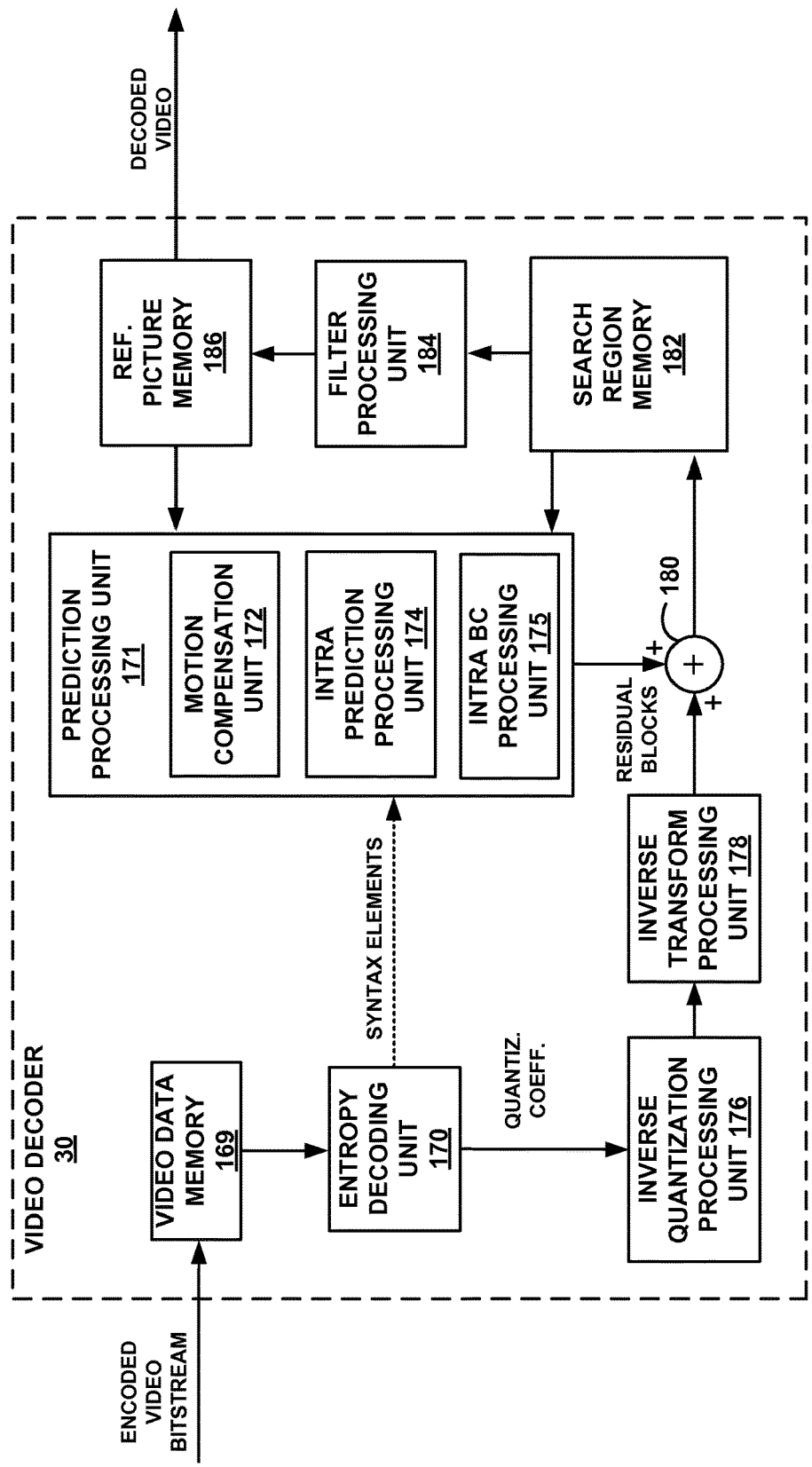
FIG. 6 is a block diagram illustrating an example video decoder that may implement the techniques of this disclosure.

FIG. 6 is a block diagram illustrating an example of video decoder 30 that may implement techniques described in this disclosure. Again, the video decoder 30 will be described in the context of HEVC coding for purposes of illustration, but without limitation of this disclosure as to other coding standards. Moreover, video decoder 30 may be configured to implement techniques in accordance with the range extensions (RExt) or screen content coding (SCC) extensions.

In the example of FIG. 6, video decoder 30 may include video data memory 169, entropy decoding unit 170, prediction processing unit 171, inverse quantization processing unit 176, inverse transform processing unit 178, summer 180, search region memory 182, filter processing unit 184, and reference picture memory 186. Prediction processing unit 171 includes motion compensation unit 172, intra prediction unit 174, and Intra BC processing unit 175. Video decoder 30 may, in some examples, perform a decoding pass generally reciprocal to the encoding pass described with respect to video encoder 20 from FIG. 5.

In various examples, a unit of video decoder 30 may be tasked to perform the techniques of this disclosure. Also, in some examples, the techniques of this disclosure may be divided among one or more of the units of video decoder 30. For example, Intra BC processing unit 175 may perform the techniques of this disclosure, alone, or in combination with other units of video decoder 30, such as motion compensation unit 172, intra prediction processing unit 174, search region memory 182, and entropy decoding unit 170.

Video data memory 169 may store video data, such as an encoded video bitstream, to be decoded by the components of video decoder 30. The video data stored in video data memory 169 may be obtained, for example, from storage device 32, from a local video source, such as a camera, via wired or wireless network communication of video data, or by accessing physical data storage media. Video data memory 169 may form a coded picture buffer (CPB) that stores encoded video data from an encoded video bitstream.

Search region memory 182 and reference picture memory 186 are examples of a decoded picture buffers (DPBs) that store reference video data for use in decoding video data by video decoder 30 (e.g., in intra-coding, inter-coding, or Intra BC modes). Video data memory 169, search region memory 182, and reference picture memory 186 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 169, search region memory 182, and reference picture memory 186 may be provided by the same memory device or separate memory devices. In various examples, video data memory 169 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 170 of video decoder 30 entropy decodes the bitstream to generate quantized coefficients, motion vectors, block vectors, or intra-prediction mode indicators, and any other syntax elements described herein with respect to the techniques of this disclosure. Entropy decoding unit 170 forwards syntax elements to prediction processing unit 171. Video decoder 30 may receive the syntax elements at the video slice level, the video block level, or higher levels, such as the picture or sequence level.

When the video slice is coded as an intra-coded (I) slice, intra prediction processing unit 174 may generate prediction data for a video block of the current video slice based on a signaled intra prediction mode and data from previously decoded blocks of the current picture. When the video picture is coded as an inter-coded (i.e., B or P) slice, motion compensation unit 172 produces predictive blocks for a video block of the current video slice based on the motion vectors and other syntax elements received from entropy decoding unit 170. The predictive blocks may be produced from one of the reference pictures within one of the reference picture lists. Video decoder 30 may construct the reference picture lists, List 0 and List 1, using default construction techniques based on reference pictures stored in reference picture memory 186.

Motion compensation unit 172 determines prediction information for a video block of the current video slice by parsing the motion vectors and other syntax elements, and uses the prediction information to produce the predictive blocks for the current video block being decoded. For example, motion compensation unit 172 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 172 may also perform interpolation based on interpolation filters. Motion compensation unit 172 may use interpolation filters as used by video encoder 20 during encoding of the video blocks to calculate interpolated values for sub-integer pixels of reference blocks. In this case, motion compensation unit 172 may determine the interpolation filters used by video encoder 20 from the received syntax elements and use the interpolation filters to produce predictive blocks.

When the video block is coded according to the Intra BC mode described herein, Intra BC processing unit 175 of prediction processing unit 171 produces predictive blocks for the current video block based on block vectors and other syntax elements received from entropy decoding unit 170. The predictive blocks may be within a search region within the same picture as the current video block, and retrieved from search region memory 182. Intra BC processing unit 175 may determine the search region using any of the techniques described herein.

Inverse quantization processing unit 176 inverse quantizes, i.e., de-quantizes, the quantized transform coefficients provided in the bitstream and decoded by entropy decoding unit 170. The inverse quantization process may include use of a quantization parameter $QP_Y$ calculated by video decoder 30 for each video block in the video slice to determine a degree of quantization and, likewise, a degree of inverse quantization that should be applied.

Inverse transform processing unit 178 applies an inverse transform, e.g., an inverse DCT, an inverse integer transform, or a conceptually similar inverse transform process, to the transform coefficients in order to produce residual blocks in the pixel domain. Video decoder 30 forms a decoded video block by summing the residual blocks from inverse transform processing unit 178 with the corresponding predictive blocks generated by prediction processing unit 171. Summer 180 represents the component or components that perform this summation operation.

Search region memory 182 stores reconstructed video blocks according to the determination of the search region for Intra BC coding of a current video block by Intra BC processing unit 175 using the techniques described herein. For example. Intra BC processing unit 175 may determine a central point for a search region for a current block of video data, and determine the search region for the current block based on the central point and a defined size for the search region. Search region memory 182 may store reconstructed blocks of video data from a current picture that includes the current block based on the determined search region. Search region memory 182 may store reconstructed video blocks that have not been in-loop filtered by filter processing unit 184. Summer 180 may provide the reconstructed video blocks to filter processing unit 184 in parallel with search region memory 182. Intra BC processing unit 175 retrieves a predictive video block for a current video block from search region memory 182.

Filter processing unit 184 may perform in-loop filtering on the reconstructed video blocks. In-loop filtering may include deblock filtering to filter block boundaries to remove blockiness artifacts from reconstructed video. In-loop filtering may also include SAO filtering to improve the reconstructed video. Reconstructed blocks, some of which may be in-loop filtered, may be stored in reference picture memory 186 as reference pictures. The reference pictures may include reconstructed blocks that may be used by motion compensation unit 172 as predictive blocks to inter-predict a block in a subsequent video frame or picture. Reference picture memory 186 also stores decoded video for later presentation on a display device, such as display device 31 of FIG. 1.

In this way, video decoder 30 may be configured to implement one or more example techniques described in this disclosure. For example, video decoder 30. e.g., Intra BC processing unit 175, may be configured to determine a central point for a search region for Intra Block Copy coding a current block of the video data, determine the search region for the current block based on the central point and a defined size for the search region, and store reconstructed blocks of the video data from a current picture that includes the current block in a memory, e.g., search region memory 182, based on the determined search region. Video decoder 30 may also be configured to decode the information from which to identify one of the reconstructed blocks within the search region from an encoded video bitstream that includes the video data, and reconstruct the current block based on the identified one of the reconstructed blocks according to Intra Block Copy.

FIG. 7 is a flow diagram illustrating an example method for determining a search region for encoding a current block of video data according to an Intra BC mode according to the techniques of this disclosure. The example technique of FIG. 7 may be implemented by a video encoder, such as video encoder 20 that includes Intra BC processing unit 149.

According to the example of FIG. 7, video encoder 20 determines a central point 54 for a search region for encoding a current video block using Intra BC (200). For example, video encoder 20 may determine the central point based on a block vector 50 of a video block previously coded using Intra BC, such as the first block of a current CTU coded using Intra BC, or a block vector 50 of a spatial or temporal neighboring block of the current CTU or the current video block. Video encoder 20 determines the search region for current block based on the central point, as well as a defined size and/or shape for the search region (202). In some examples, video encoder 20 may determine a desired search region, determine a central point for the desired search region, and signal information, such as a location or a neighboring block, from which video decoder 30 may determine the central point in the encoded video bitstream.

According to the example of FIG. 7, video encoder 20 determines whether a portion of the determined search region is unavailable to be used for prediction of the current video block according to Intra BC (204). If a portion of the search region is unavailable, video encoder 20 may modify the search region, e.g., by restricting, padding, or shifting the search region according to any of the techniques described herein (206). As described herein, restricting may include restricting the search region to blocks that are certain to have been processed according to WPP, shifting may include shifting to one side of a boundary without changing a size or shape of the search region, and padding may include padding with copied or fixed values. Whether or not the search region is modified, video encoder 20 stores reconstructed blocks, e.g., within search region memory 164, based on the determined (and in some cases modified) search region (208).

Video encoder 20 selects a predictive block 46 from the search region (210). Video encoder 20 determines a block vector 50 for the predictive block, and determines a residual block based on the current and predictive blocks. Video encoder 20 encodes syntax information in the encoded video bitstream from which video decoder 30 may determine the block vector and residual block, and any other syntax information related to the techniques of this disclosure, such as syntax information from which video decoder may determine the search region, e.g., a location of a central point, a neighboring block from whose block vector a central point may be determined, or a size and/or shape of the search region (212).

Figure 8:
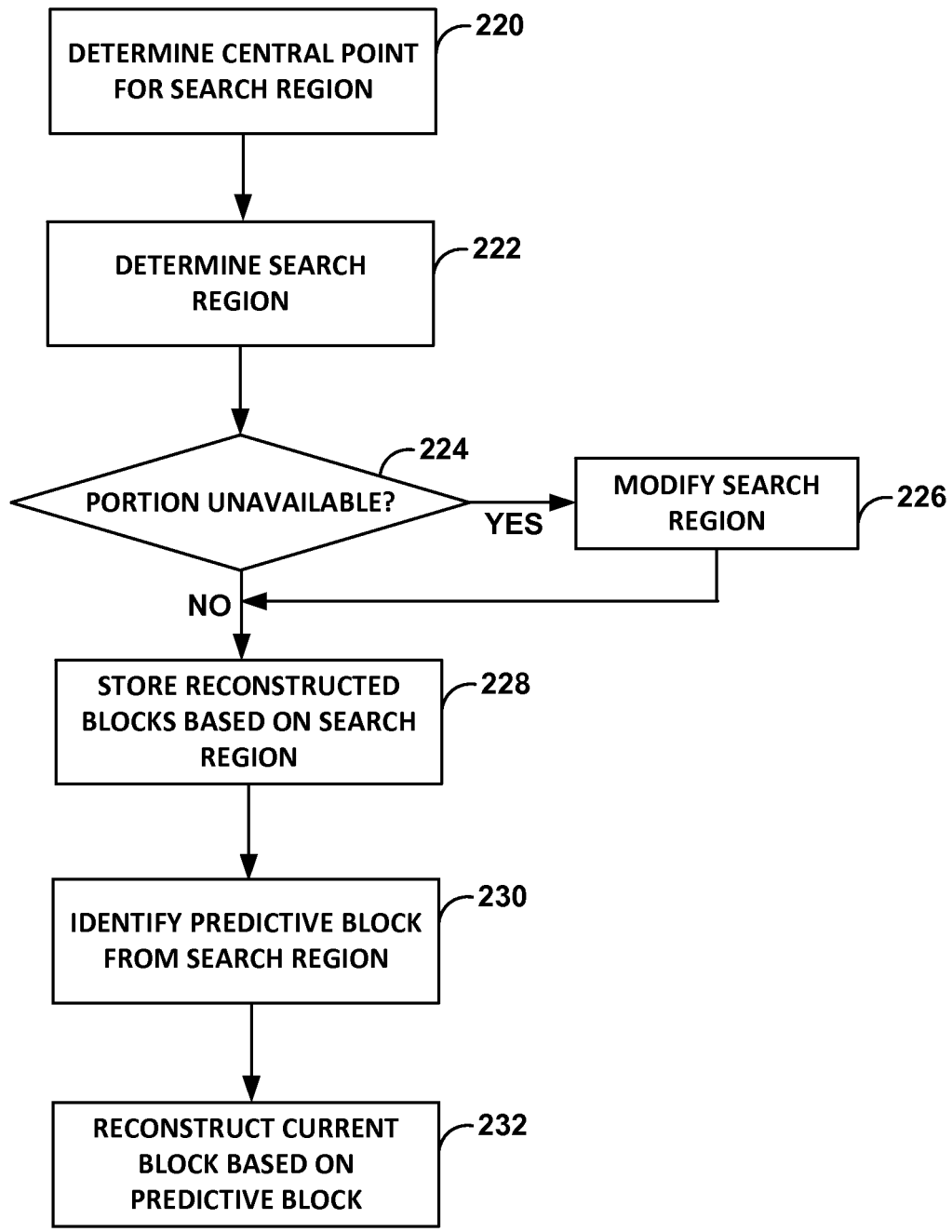
FIG. 8 is a flow diagram illustrating an example method for determining a search region for decoding a current block of video data according to an Intra BC mode according to the techniques of this disclosure.

FIG. 8 is a flow diagram illustrating an example method for determining a search region for decoding a current block of video data according to an Intra BC mode according to the techniques of this disclosure. The example technique of FIG. 8 may be implemented by a video decoder, such as video decoder 30 that includes Intra BC processing unit 175.

According to the example of FIG. 8, video decoder 30 determines a central point 54 for a search region for encoding a current video block using Intra BC (220). For example, video decoder 30 may determine the central point based on a block vector 50 of a video block previously coded using Intra BC, such as the first block of a current CTU coded using Intra BC, or a block vector 50 of a spatial or temporal neighboring block of the current CTU or the current video block. Video decoder 30 determines the search region for current block based on the central point, as well as a defined size and/or shape for the search region (222). In some examples, video decoder 30 may decode syntax information that specifies the central point, e.g., coordinates or a vector, and/or the size or shape of the search region, e.g., signaling pixel values or multiples of a known values, such as LCU size, from the encoded video bitstream.

According to the example of FIG. 8, video decoder 30 determines whether a portion of the determined search region is unavailable to be used for prediction of the current video block according to Intra BC (224). If a portion of the search region is unavailable, video decoder 30 may modify the search region, e.g., by restricting, padding, or shifting the search region according to any of the techniques described herein (226). Whether or not the search region is modified, video decoder 30 stores reconstructed blocks, e.g., within search region memory 182, based on the determined (and in some cases modified) search region (228).

Video decoder 30 identifies a predictive block 46 from the search region, e.g., based on syntax information in the encoded video bitstream identifying a block vector 50 for the current video block (230). The block vector points to a location of the predictive block in the current picture relative to the current block, such as an upper left upper right, lower left, lower right, or central pixel of the predictive block. Video decoder 30 also determines a residual block based on the encoded video bitstream, and sums the predictive block and the residual block to reconstruct the current video block (232).

Certain aspects of this disclosure have been described with respect to the HEVC standard and its extensions for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
  determining that a current picture of the video data is an inter coded picture comprising both blocks that are spatially predicted by copying other blocks in the current picture and blocks that are temporally predicted from blocks in reference pictures that are different than the current picture;
  determining that a current block of the current picture is coded using an intra block copy mode;
  in response to the current block being coded using the intra block copy mode, determining a central point for a search region for decoding the current block using the intra block copy mode, wherein determining the central point for the search region comprises locating the central point for the search region using a block vector of a previously decoded block;
  determining the search region for the current block based on the central point and a defined size of a rectangular region, wherein the central point for the search region is a central point of the rectangular region, and wherein the determined search region comprises less than a full available frame corresponding to the current picture;

storing reconstructed blocks of the current picture that are within the determined search region in a memory;

decoding information from which to identify one of the reconstructed blocks within the determined search region;

reconstructing the current block based on the identified one of the reconstructed blocks;

outputting a picture of decoded video data comprising the reconstructed current block;

determining that a second current picture of the video data is an intra coded picture comprising only blocks that are spatially predicted by copying other blocks in the second current picture;

determining that a second current block of the second current picture is coded using the intra block copy mode;

in response to the second current block being coded using the intra block copy mode, determining that a second search region for decoding the second current block of the video data using the intra block copy mode comprises a full available frame corresponding to the second current picture;

storing reconstructed blocks of the full available region of the second current picture in the memory, wherein the second current block belongs to the second current picture;

decoding second information from which to identify one of the reconstructed blocks within the second search region;

reconstructing the second current block based on the identified one of the reconstructed blocks within the second search region; and outputting a second picture of decoded video data comprising the reconstructed second current block.

2. The method of claim 1, wherein the previously decoded block comprises a first block of a current coding tree unit (CTU) that was decoded using the intra block copy mode, wherein the current CTU includes at least the current block and the first block and wherein determining the central point for the search region comprises:

identifying a block vector of the first block; and determining the central point for the search region based on the identified block vector of the first block.

3. The method of claim 1, wherein the previously decoded block comprises a neighboring block of at least one of the current block or a current coding tree unit (CTU) that includes the current block and at least one other block of the video data, and wherein determining the central point for the search region comprises:

identifying a block vector of the neighboring block; and determining the central point for the search region based on the identified block vector.

4. The method of claim 1, wherein a location of the central point within the current picture is signaled in an encoded video bitstream that includes the video data.

5. The method of claim 1, wherein the size of the rectangular region is one of predefined or signaled in an encoded video bitstream that includes the video data.

6. The method of claim 5, wherein the size of the rectangular region is defined by a width and a height, wherein the width is defined as a multiple of a coding tree unit (CTU) width, and the height is defined as a multiple of a CTU height.

7. The method of claim 5, wherein the size of the rectangular region is defined by a width and a height in terms of pixel units.

8. The method of claim 1, further comprising:

identifying a portion of the determined search region that is unavailable for coding the current block; and padding the unavailable portion of the search region with sample values by at least one of:

copying sample values proximate to the unavailable portion of the search region, or using fixed sample values.

9. The method of claim 1, further comprising:

determining that a portion of the determined search region is on a different side of a boundary than the current block, wherein the boundary comprises at least one of a slice boundary, a tile boundary, or a boundary of the current picture; and shifting the determined search region, wherein an entirety of the shifted search region is on a same side of the boundary as the current block.

10. The method of claim 1, further comprising:

determining that the current picture is coded using wavefront parallel processing (WPP); and restricting the determined search region for the current block based on the determination that the current picture is coded using WPP.

11. The method of claim 10, wherein restricting the determined search region for the current block based on the determination that the current picture is coded using WPP comprises restricting the determined search region to one of:

coding tree units (CTUs) that are left of and in a current row of a current CTU that includes the current block;

CTUs that are left, diagonally left-above, or above relative to the current CTU; or CTUs that are left, diagonally left-above, or above relative to the current CTU and, for rows above the current row, an additional two rightward CTUs per row above the current row according to an entropy coding delay for WPP.

12. A device for decoding video data, the device comprising:

a memory configured to store video data; and one or more processors configured to:

determine that a current picture of the video data is an inter coded picture comprising both blocks that are spatially predicted by copying other blocks in the current picture and blocks that are temporally predicted from blocks in reference pictures that are different than the current picture;

determine that a current block of the current picture is coded using an intra block copy mode;

in response to the current block being coded using the intra block copy mode, determine a central point for a search region for decoding the current block using the intra block copy mode, wherein to determine the central point for the search region, the one or more processors are configured to locate the central point for the search region using a block vector of a previously decoded block;

determine the search region for the current block based on the central point and a defined size of a rectangular region, wherein the central point for the search region is a central point of the rectangular region, and wherein the determined search region comprises less than a full available frame corresponding to the current picture;

store reconstructed blocks of the current picture that are within the determined search region in a memory;

decode information from which to identify one of the reconstructed blocks within the determined search region;

reconstruct the current block based on the identified one of the reconstructed blocks;
output a picture of decoded video data comprising the reconstructed current block;
determine that a second current picture of the video data is an intra coded picture comprising only blocks that are spatially predicted by copying other blocks in the second current picture;
determine that a second current block of a second current picture is coded using the intra block copy mode;
in response to the second current block being coded using the intra block copy mode, determine that a second search region for decoding the second current block of the video data using the intra block copy mode comprises a full available frame corresponding to the second current picture;
store reconstructed blocks of the full available region of the second current picture in the memory, wherein the second current block belongs to the second current picture;
decode second information from which to identify one of the reconstructed blocks within the second search region;
reconstruct the second current block based on the identified one of the reconstructed blocks within the second search region; and
output a second picture of decoded video data comprising the reconstructed second current block.

13. The device of claim 12, wherein the previously decoded block comprises a first block of a current coding tree unit (CTU) that was decoded using the intra block copy mode, wherein the current CTU includes at least the current block and the first block, and wherein to determine the central point for the search region, the one or more processors are configured to:
identify a block vector of the first block; and
determine the central point for the search region based on the identified block vector.

14. The device of claim 12, wherein the previously decoded block comprises a neighboring block of at least one of the current block or a current coding tree unit (CTU) that includes the current block and at least one other block of the video data, and wherein the one or more processors are configured to:
identify a block vector of the neighboring block; and
determine the central point for the search region based on the identified block vector.

15. The device of claim 12, wherein a location of the central point within the current picture is signaled in an encoded video bitstream that includes the video data.

16. The device of claim 12, wherein the size of the rectangular region is one of predefined or signaled in an encoded video bitstream that includes the video data.

17. The device of claim 16, wherein the size of the rectangular region is defined by a width and a height, wherein the width is defined as a multiple of a coding tree unit (CTU) width, and the height is defined as a multiple of a CTU height.

18. The device of claim 16, wherein the size of the rectangular region is defined by a width and a height in terms of pixel units.

19. The device of claim 12, wherein the one or more processors are configured to:
identify a portion of the determined search region that is unavailable for coding the current block; and
pad the unavailable portion of the search region with sample values by at least one of:
copying sample values proximate to the unavailable portion of the search region, or
using fixed sample values.

20. The device of claim 12, wherein the one or more processors are configured to:
determine that a portion of the determined search region is on a different side of a boundary than the current block, wherein the boundary comprises at least one of a slice boundary, a tile boundary, or a boundary of the current picture; and
shift the determined search region, wherein an entirety of the shifted search region is on a same side of the boundary as the current block.

21. The device of claim 12, wherein the one or more processors are configured to:
determine that the current picture is coded using wavefront parallel processing (WPP); and
restrict the determined search region for the current block based on the determination that the current picture is coded using WPP.

22. The device of claim 21, wherein the one or more processors are configured to, based on the determination that WPP is used to code the current picture, restrict the determined search region for the current block to one of:
coding tree units (CTUs) that are left of and in a current row of a current CTU that includes the current block;
CTUs that are left, diagonally left-above, or above relative to the current CTU; or
CTUs that are left, diagonally left-above, or above relative to the current CTU and, for rows above the current row, an additional two rightward CTUs per row above the current row according to an entropy coding delay for WPP.

23. A non-transitory computer-readable storage medium having instructions stored thereon that when executed cause one or more processors of a video decoder to:
determine that a current picture of the video data is an inter coded picture comprising both blocks that are spatially predicted by copying other blocks in the current picture and blocks that are temporally predicted from blocks in reference pictures that are different than the current picture;
determine that a current block of the current picture is coded using an intra block copy mode;
in response to the current block being coded using the intra block copy mode, determine a central point for a search region for decoding the current block using the intra block copy mode, wherein to determine the central point for the search region, the one or more processors are configured to locate the central point for the search region using a block vector of a previously decoded block;
determine the search region for the current block based on the central point and a defined size of a rectangular region, wherein the central point for the search region is a central point of the rectangular region, and wherein the determined search region comprises less than a full available frame corresponding to the current picture;
store only reconstructed blocks of the current picture that are within the determined search region in a memory;
decode information from which to identify one of the reconstructed blocks within the determined search region;
reconstruct the current block based on the identified one of the reconstructed blocks; and output a picture of decoded video data comprising the reconstructed current block;
determine that a second current picture of the video data is an intra coded picture comprising only blocks that are spatially predicted by copying other blocks in the second current picture;
determine that a second current block of a second current picture is coded using the intra block copy mode;
in response to the second current block being coded using the intra block copy mode, determine that a second search region for decoding the second current block of the video data using the intra block copy mode comprises a full available frame corresponding to the second current picture;
store reconstructed blocks of the full available region of the second current picture in the memory, wherein the second current block belongs to the second current picture;
decode second information from which to identify one of the reconstructed blocks within the second search region;
reconstruct the second current block based on the identified one of the reconstructed blocks within the second search region; and
output a second picture of decoded video data comprising the reconstructed second current block.

* * * * *